(12) United States Patent
Muramatsu et al.

(10) Patent No.: US 6,249,000 B1
(45) Date of Patent: Jun. 19, 2001

(54) SCANNING PROBE MICROSCOPE

(75) Inventors: Hiroshi Muramatsu; Eisuke Tomita, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/128,181

(22) Filed: Aug. 3, 1998

(51) Int. Cl.⁷ .................................................. H01J 37/28
(52) U.S. Cl. .............................................. 250/306; 73/105
(58) Field of Search .................................. 250/306, 307; 73/105

(56) References Cited

U.S. PATENT DOCUMENTS

| | | | |
|---|---|---|---|
| 5,338,932 | 8/1994 | Theodore et al. | 250/306 |
| 5,641,896 | 6/1997 | Karrai | 73/105 |
| 5,679,952 | * 10/1997 | Lutwyche et al. | 250/306 |
| 5,883,705 | * 3/1999 | Minne et al. | 250/306 |
| 5,932,876 | * 8/1999 | Niedermann | 250/306 |
| 6,006,594 | * 12/1999 | Karrai et al. | 250/306 |

OTHER PUBLICATIONS

IBM Technical Disclosure Bulletin, vol. 34, No. 10A, Mar. 1992, pp. 194–195, "Double Cantilever Sensor for Thin--Film Hardness Testing and Mass Storage Application".

Patent Abstracts of Japan, vol. 016, No. 337 (P–1390) Jul. 22, 1992.

Patent Abstracts of Japan, vol. 095, No. 002, Mar. 31, 1995.

\* cited by examiner

*Primary Examiner*—Kiet T. Nguyen
(74) *Attorney, Agent, or Firm*—Adams & Wilks

(57) ABSTRACT

A scanning probe microscope comprises a cantilever probe disposable proximate a surface of a sample and having a first resonance frequency. A three-dimensional fine movement element scans the cantilever probe and the surface of the sample relative to one another two-dimensionally. A sensor cantilever detects displacement of the cantilever probe during relative scanning movement between the cantilever probe and the surface of the sample. The sensor cantilever has a second resonance frequency different from the first resonance frequency and is disposed spaced apart but within touching distance from the cantilever probe so that displacement of the cantilever probe is transmitted to the sensor cantilever by contact between the sensor cantilever and the cantilever probe.1

28 Claims, 6 Drawing Sheets

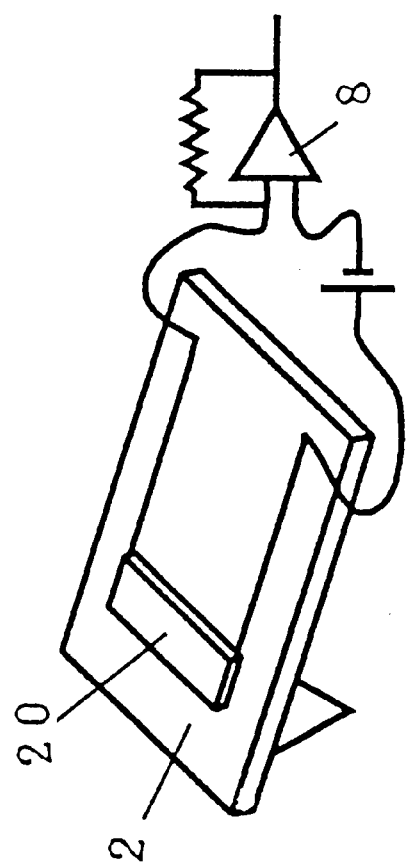
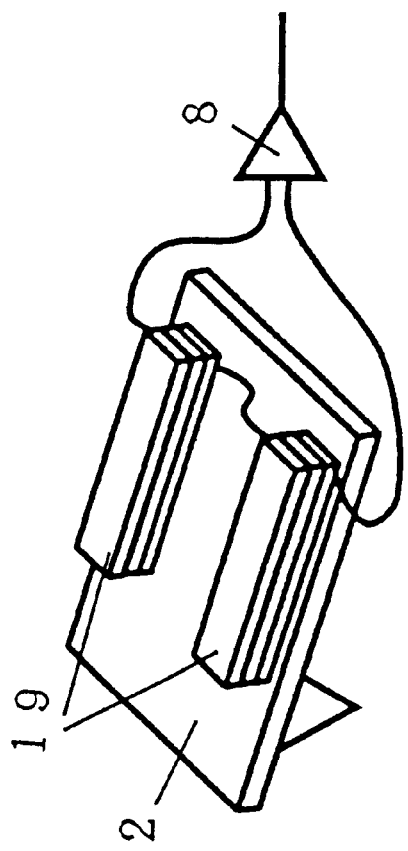
FIG.9A
FIG.9B

SCANNING PROBE MICROSCOPE

BACKGROUND OF THE INVENTION

The present invention relates to a scanning type atomic force microscope for observing the shape of a surface of a sample as well as a scanning probe microscope for observing the surface physical properties by scanning a probe along the surface of the sample by utilizing a force exerted between substances (that is, a force exerted between the probe and sample).

According to a conventional scanning type atomic force microscope, by using a cantilever formed by silicon nitride or silicon and a stylus formed thereon as a probe for the atomic force microscope, an atomic force exerted between a front end of the stylus and the surface of the sample is detected as a bending movement of the cantilever, a change in an oscillation amplitude or a change in resonance frequency, and the surface of the sample is observed by moving the stylus and the sample relative to each other while controlling a distance between the front end of the stylus and the surface of the sample constant. As another control method, there is a control method of a shear force system where the probe is oscillated horizontally in respect of the surface of the sample. An optical method such as an optical lever method, an optical interference method or the like is mainly used for detecting the displacement of the cantilever. When such an optical method is used, the constitution of the device becomes complicated and adjustment of an optical axis or the like is needed which makes handling of the device complicated.

With respect thereto, a cantilever incorporating a piezoelectric detecting mechanism which electrically detects oscillation has been described in Japanese Unexamined Patent Publication No. JP-A-5-196458 and Japanese Unexamined Patent Publication No. JP-A-6-323845.

Further, a proposal in which a quartz oscillator is used as a probe for an atomic force microscope has been described in Japanese Unexamined Patent Publication No. JP-A-63-309803 and Japanese Unexamined Patent Publication No. JP-A-4-102008.

Further, a method of carrying out nonoptical detection by integrating a tuning fork type quartz oscillator and an optical fiber for constituting a scanning type near-field microscope has been disclosed in Japanese Unexamined Patent Publication No. JP-A-9-89911.

According to each of the detecting methods which do not utilize optical means must integrally form the piezoelectric element and the probe and there poses a problem where even in the case where a portion of the probe is destructed or malfunction is partially caused, a total of the probe must be interchanged. Particularly, in the process of fabricating the probe, when a fixing operation such as adhesion or the like is carried out, there also poses a problem in the reproducibility of dynamic properties.

Further, when static bending of the probe is detected, drift of a base signal included in a static signal is pointed out as a problem in control.

Further, acquisition of function information other than shape information in a nonoptical detecting system is also an important problem.

SUMMARY OF THE INVENTION

It is an object of the present invention to provide a scanning probe microscope wherein by separately preparing the probe portion for scanning the surface and the piezoelectric cantilever element for detecting the displacement of the probe, the shape of the surface of the sample can be electrically measured without using a conventional optical detecting method and running cost of the probe which is a consumable article can be restrained low.

It is another object of the present invention to provide a scanning probe microscope wherein even in the case where the shape of the surface of the sample is measured by a static control system, the detection can be carried out by an alternating current signal and therefore, stable control without being influenced by drift of signal can be performed.

It is a further object of the present invention to provide a scanning probe microscope wherein observation of function information other than shape information can be carried out in a nonoptical detection system using a piezoelectric element.

BRIEF DESCRIPTION OF THE DRAWINGS

FIGS. 9A and 9B illustrate explanatory views of probes in a scanning probe microscope according to the present invention;

DETAILED DESCRIPTION OF THE PREFERRED EMBODIMENTS

Figure 1:
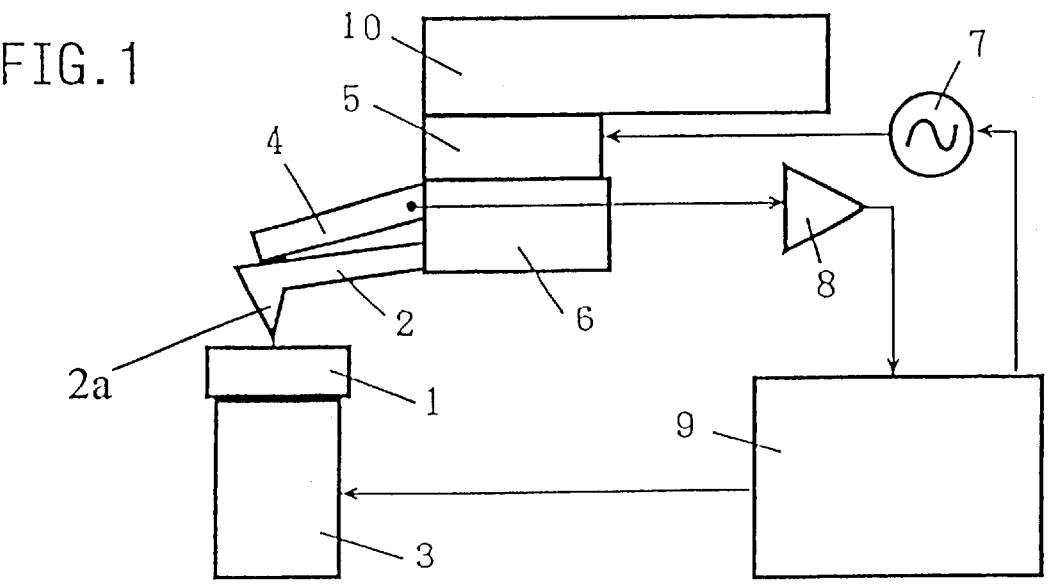
FIG. 1 is an explanatory view of a scanning probe microscope according to the present invention.

In order to resolve the above-described problem, according to the present invention, there is devised a scanning probe microscope in which a cantilever probe is closely arranged on a surface of a measurement object and the cantilever probe is relatively scanned two-dimensionally on the surface of the measurement object by using a three-dimensional fine movement element thereby observing the surface shape or surface physical properties of the measurement object, and at least as means for detecting a displacement of the cantilever probe, a sensor cantilever is installed at a distance touchable to the cantilever, apart therefrom, separately from the cantilever probe. In the microscope, oscillating means for oscillating either or both of the cantilever probe and the sensor cantilever is installed, distance control between the cantilever probe and the surface of the measurement object is carried out by a change in resonance characteristic of the sensor cantilever by which the cantilever probe can be operated by being separated from detecting means, and nonoptical detection for detecting the displacement by an electric signal is made possible by using a piezoelectric element in the sensor cantilever. Further, resonance frequency of the sensor cantilever is made higher than resonance frequency of the cantilever probe, by resonance oscillation of the sensor cantilever, the cantilever probe is provided with bending by being brought into dynamic equilibrium between the surface of the measurement object and the oscillating sensor cantilever by which by a change in resonance characteristic of the sensor cantilever, static bending of the cantilever is detected as an alternating current signal, static force exerted between the cantilever probe and the surface of the measurement object is detected and the distance control between the front end of the probe and the surface of the measurement object can be carried out.

Meanwhile, substantial resonance frequency of the cantilever probe is made higher than the resonance frequency of the sensor cantilever, the probe cantilever is oscillated at a frequency the same as that of oscillating the sensor cantilever and by a change in the resonance characteristic of the sensor cantilever, the distance control between the front end of the cantilever probe and the surface of the measurement object is carried out by which the distance control of the probe in an oscillation mode is made possible.

Further, according to the microscope of the present invention, by installing a position adjusting function, contact pressure between the cantilever probe and the sensor cantilever can arbitrarily be changed and the operational characteristic of the probe can be adjusted to be optimum.

An optical wave guide is included at a portion of the cantilever probe and is constituted such that one end face of the wave guide coincides with the front end of the probe for observing function information by which observation of optical information is made possible. Further, piezoelectric detecting means is provided to the cantilever probe and outputs a signal of displacement of the probe independently from the signal of the sensor cantilever by which observation of information of surface physical properties is made possible.

An explanation will be given of embodiments of the present invention in reference to the drawings as follows.

FIG. 1 shows an example of the constitution of a scanning probe microscope according to the present invention. According to the constitution of FIG. 1, a cantilever probe 2 had a probe tip 2a arranged closely on the surface of a measurement object 1 and a three-dimensional fine movement element 3 scans relatively the surface of the measurement object 1 two-dimensionally. Thereby, a surface shape or surface physical properties of the measurement object can be observed. As means for detecting displacement of the cantilever probe 2, a detecting member or sensor cantilever 4 is installed at a supporter 6 separately from the cantilever 2, apart therefrom and at a distance touchable to the cantilever probe 2. In this case, "touchable" indicates a state where they are originally brought into contact with each other or where they are separated from each other by a distance where they can be brought into contact with each other by oscillation. Oscillating means 5 is driven by an alternating current voltage source 7 and oscillates either one or both of the cantilever probe 2 and the sensor cantilever 4. A change in resonance characteristic of the sensor cantilever 4 which is caused based on a distance between the cantilever probe 2 and the surface of the sample 1 is inputted to a control device 9 via an amplifier 8. The control device 9 can control the distance between the probe and the surface of the measurement object by controlling the fine movement element 3 based on the change in the resonance characteristic.

In detecting the displacement of the sensor cantilever 4 of the scanning probe microscope, the conventional optical detection system may be used or the displacement may be detected by an electric signal by using a piezoelectric detection element at the sensor cantilever 4.

Further, the device constitution diagram shown by FIG. 1 describes major portions according to the present invention and in actual reduction to practice of the present invention, constituent elements which are generally used in the probe microscope other than those described in FIG. 1 are included.

Next, an explanation will be given of a detailed operational system in reference to FIG. 2 through FIG. 6.

Figure 2:
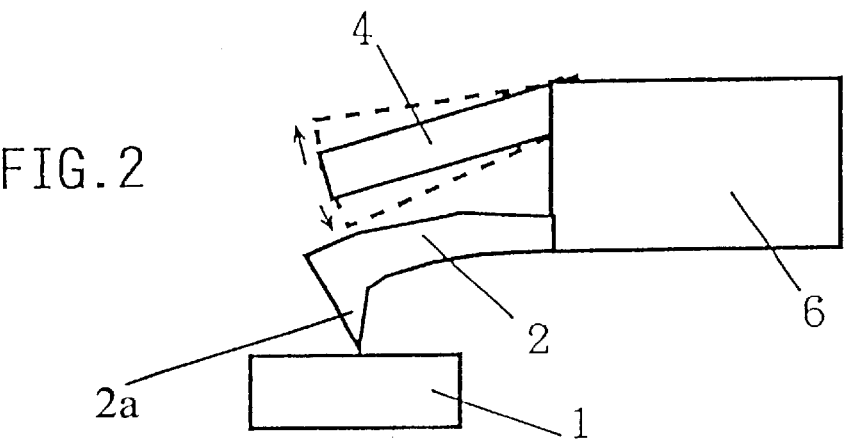
FIG. 2 is an explanatory view of the operational principle of the scanning probe microscope according to the present invention.

FIG. 2 is a view for explaining the operation in the case where the resonance frequency of the sensor cantilever 4 is set higher than the resonance frequency of the cantilever probe 2. By the resonance oscillation of the sensor cantilever 4, the cantilever probe 2 is provided with a bending caused by being brought into dynamic equilibrium between the oscillating sensor cantilever 4 and the surface of the measurement object 1. By the bending of the cantilever probe 2, the resonance characteristic of the sensor cantilever 4 is changed. Based on the change in the resonance characteristic, a static force exerted between the cantilever probe 2 and the surface of the measurement object 1 can be detected and the distance control can be carried out between the front end of the probe and the surface of the measurement object. That is, the cantilever probe 2 cannot follow the oscillation of the sensor cantilever 4 and therefore, only the sensor cantilever 4 is oscillated and continuously repeats collision to the cantilever probe 2. The cantilever probe 2 is provided with constant bending by the continuous collision. In this case, according to the sensor cantilever 4, owing to the collision to the cantilever probe 2, the amount of oscillation is reduced compared with free oscillation in the resonance state and phase of oscillation is also changed. When the cantilever probe 2 is made close to the surface of the measurement object 1, attractive force or repulsive force accompanied by operation of atomic force is caused at the cantilever probe 2 and the measurement object 1. When attractive force is exerted on the cantilever 2, the amplitude of oscillation of the sensor cantilever 4 is increased and when repulsive force is exerted thereon, the amplitude of oscillation of the sensor cantilever 4 is reduced. In this way, by this system, in a so-called contact mode AFM for detecting the static bending of the cantilever probe, the distance control between the sample-probe can be carried out by an alternating current signal. However, according to the control system, it is preferable to prevent a frequency inducing higher order of resonance mode in the cantilever probe from coinciding with the resonance frequency of the sensor cantilever. Further, when the number of order is increased, the influence is reduced. Further, in respect of the resonance frequency of the cantilever probe, apparent resonance frequency is increased by pressure exerted by the sensor cantilever. Accordingly, the resonance frequencies of the two cantilevers need to be set sufficiently different from each other in consideration thereof.

Figure 3:
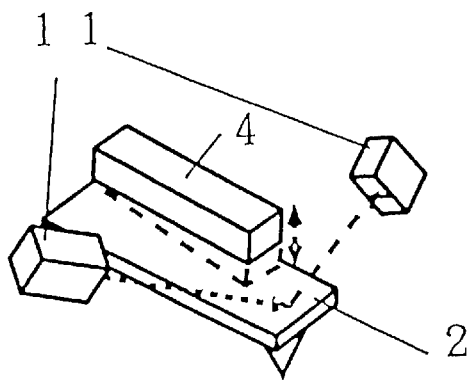
FIG. 3 is an explanatory view of the operational principle of the scanning probe microscope according to the present invention.

FIG. 3 is a view showing a constitution of detecting twist of the cantilever probe in the contact mode operation mentioned above. In the contact mode operation, in the case where the cantilever probe is twisted by friction with the sample, light from a light source is reflected by the twisted cantilever probe 2, reflected light is detected by optical detecting means 11 and an amount of twist is detected by which friction information of the sample surface can be observed. Although as twist detecting means, as shown by FIG. 3, the optical detecting means 11 such as one by an optical lever method can be used, a piezoelectric detecting system mentioned later can also be used.

Figure 4:
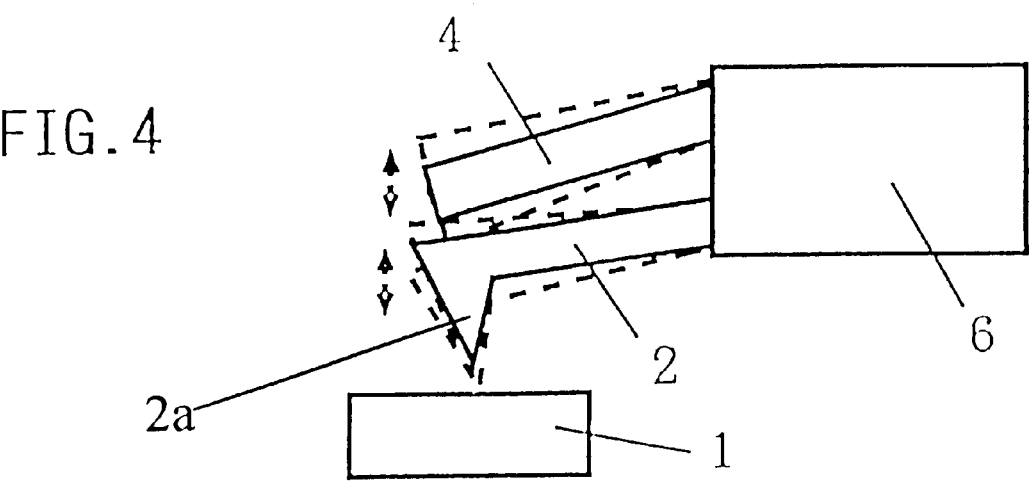
FIG. 4 is an explanatory view of the operational principle of the scanning probe microscope according to the present invention.

FIG. 4 is a view showing a constitution in which the substantial resonance frequency of the cantilever probe 2 is set to be higher than the resonance frequency of the sensor cantilever 4. The probe cantilever 2 is oscillated at a frequency the same as that in oscillating the sensor cantilever 4 and the distance control between the front end of the cantilever probe 2 and the surface of the measurement object 1 is carried out by the change in the resonance frequency of the sensor cantilever 4 by which the distance control of a so-called dynamic mode system can be carried out.

In carrying out the dynamic mode operation, means for detecting the phase and the amplitude of the cantilever probe 2 is provided independently from the sensor cantilever 4 and the displacement signal of the sensor cantilever 4 is compared with the displacement signal of the cantilever probe 2 by which a so-called phase image can be provided. Further, as a method of obtaining function information of viscoelastic information of the surface of the sample 1 or the like, since in the atmosphere, there is influence of adsorbed water, a change in phase which is dependent on viscoelasticity inherent to the sample can be obtained by setting the amplitude of oscillation of the cantilever probe 2 to about several nanometers such that the front end of the probe is always prevented from leaving the adsorbed water whereby viscoelastic information can be obtained.

Figure 5:
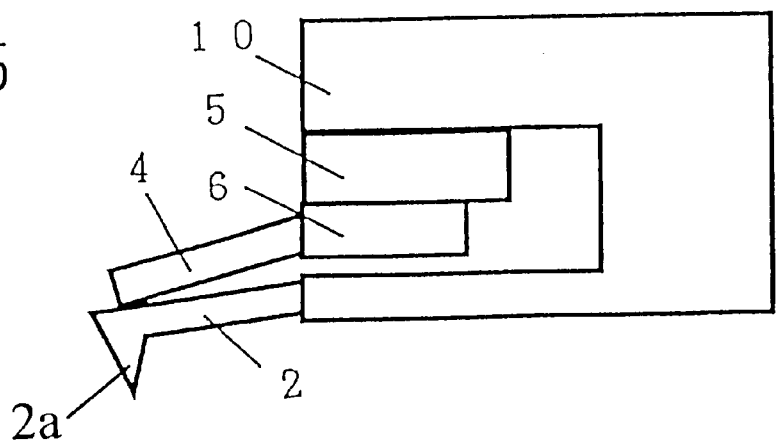
FIG. 5 is an explanatory view of a scanning probe microscope according to the present invention.

As means for oscillating the cantilever probe 2 and the sensor cantilever 4, these cantilevers can be oscillated by applying an alternating current signal to the piezoelectric element 5. The cantilever probe 2 and the sensor cantilever 4 are fixed onto the same supporter 6 and the piezoelectric element 5 is oscillated at a frequency near to the resonance frequency of the sensor cantilever 4 by which the sensor cantilever 4 is resonated and its oscillation amplitude can be made larger than that of the cantilever probe 2. In this case, similar operation is shown as in the case where only the sensor cantilever 4 is oscillated by a piezoelectric element as shown by FIG. 5. FIG. 5 is a view showing a constitution where the cantilever probe 2 is supported by the supporter 10 and only the sensor cantilever 4 is oscillated by the piezoelectric element 5.

In the case of the contact mode operation mentioned above, a change in the distance between the sensor cantilever 4 and the cantilever probe 2 or a change in contact pressure therebetween is caused based on the bending of the cantilever probe 2 and the change can be detected as a change in amplitude or a change in phase of the sensor cantilever 4. The surface shape of the measurement object 1 can be observed by controlling the fine movement element 3 comprising the piezoelectric element by the control device 9 which controls the amount of the displacement constant by a feedback control.

In the case where the resonance frequency of the sensor cantilever is higher than that of the cantilever probe mentioned above, there is a case where an adhering force for adhering the probes may be caused between the cantilever probe and the sensor cantilever due to adsorbed water on the surface or the like. In this case, the force is received by the sensor cantilever in a direction in which the cantilever probe leaves the face of the sample and the bending of the cantilever probe cannot be accurately detected. In order to avoid such a problem, hydrophobic treatment is carried out in respect of both sides or one side of portions where the cantilever probe and the sensor cantilever are brought into contact with each other by which the problem can be avoided. As the hydrophobic treatment method, there can be used a general method where a molecule having hydrophobic radical is directly chemically bonded or physically adsorbed onto the portion such that the hydrophobic radical is directed to the outer side.

Figure 6:
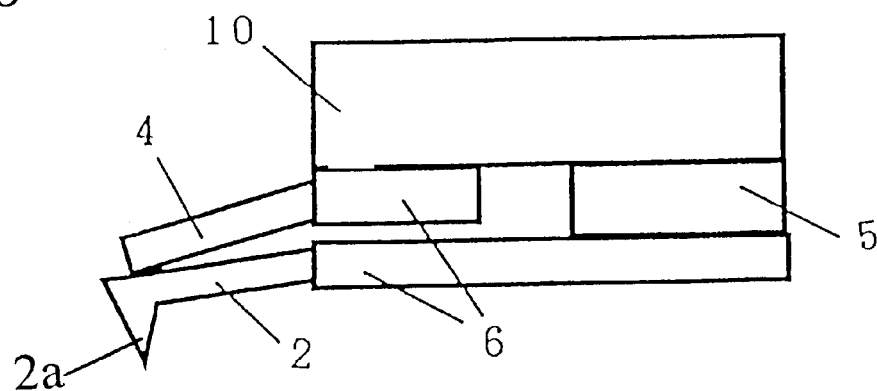
FIG. 6 is an explanatory view of a scanning probe microscope according to the present invention.

In the case of the dynamic mode operation mentioned above, the cantilever probe 2 is oscillated at the same frequency by the sensor cantilever 4 and the force exerted on the cantilever probe 2 is indirectly detected as a change in the amplitude or the phase of oscillation. In this case, as means for oscillating the cantilever probe 2 and the sensor cantilever 4, there are a system where the cantilever probe 2 and the sensor cantilever 4 are fixed onto the same holder 6 and the sensor cantilever 4 is resonated by oscillating the piezoelectric oscillator 5 at a frequency near to the resonance frequency of the sensor cantilever 4 and a system where only the sensor cantilever 4 is oscillated by the piezoelectric oscillator 5 and the cantilever probe 2 is oscillated by the sensor cantilever 4. Further, FIG. 6 shows a constitution in which only the cantilever probe 2 connected to the supporter 6 is oscillated by the piezoelectric element 5 by which the sensor cantilever 4 the end of which is brought into contact with the cantilever probe 2, is oscillated. Thereby, there can be adopted a system where the displacement of the cantilever probe 2 is detected as a change in the oscillation of the sensor cantilever 4.

Figure 7:
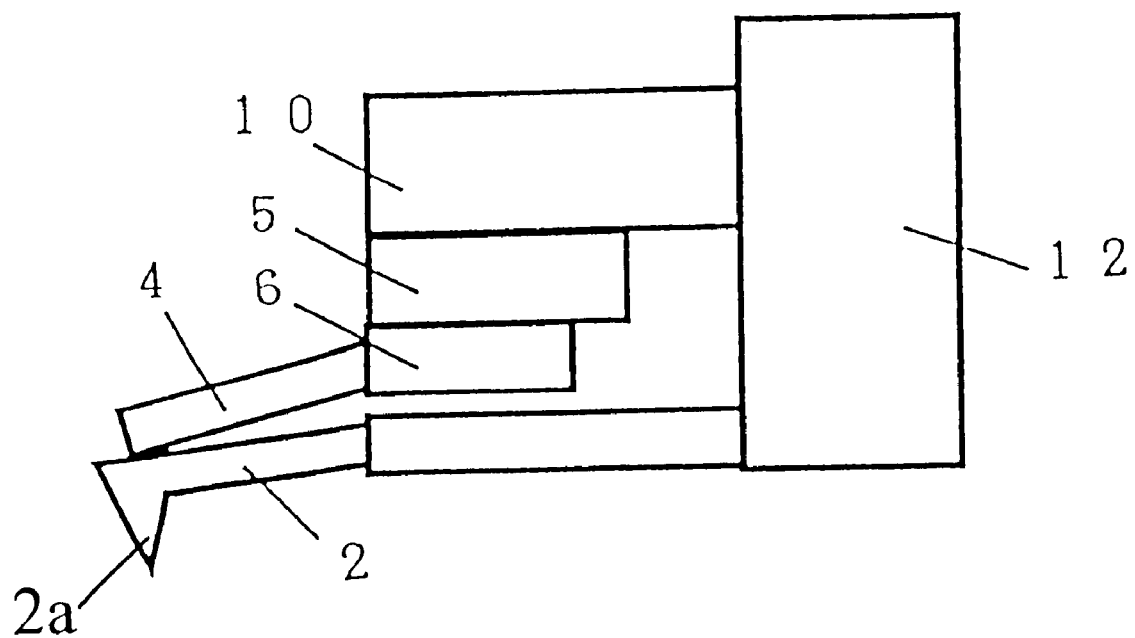
FIG. 7 is an explanatory view of a scanning probe microscope according to the present invention.

FIG. 7 is a view showing a constitution in which a position adjusting mechanism 12 is installed to the device constitution described in reference to FIG. 1 through FIG. 6. By installing the position adjusting mechanism 12, the contact pressure between the cantilever probe 2 and the sensor cantilever 4 can arbitrarily be changed. Thereby, adjustment can be carried out such that the measurement is performed under an optimum condition.

As a piezoelectric element used in the sensor cantilever 4 according to the present invention, a piezoelectric ceramics element of PZT or the like having the piezoelectric characteristic in the thickness direction or a piezoelectric element of a bimorph type having the piezoelectric characteristic in the bending direction where two sheets of films having the piezoelectric characteristic in the lateral direction are pasted together can be used. Further, there are a method where a change in the resistance of silicon doped with ZnO or an impurity or the like is used and a method where the bending oscillation of a quartz oscillator is used. In the case of a quartz oscillator, the bending oscillation of an X plate quartz oscillator or a tuning fork type quartz oscillator is utilized and electric charge generated at an electrode of the quartz oscillator can be used as a control signal by amplifying it by the amplifier 8.

Next, a detailed description will be given of a method of observing function information other than shape information of the surface of the sample simultaneously with measuring the shape of the surface of the sample. In respect of the measurement of the shape of the surface of the sample, a description has been given and an explanation thereof will be omitted and in the following, an explanation will be given of a method of observing function information other than the information of the shape of the surface of the sample.

First, observation of optical information can be realized by constituting a cantilever probe including an optical wave guide at a portion of the cantilever probe and such that one end face of the wave guide coincides with the front end of the probe.

Figure 8:
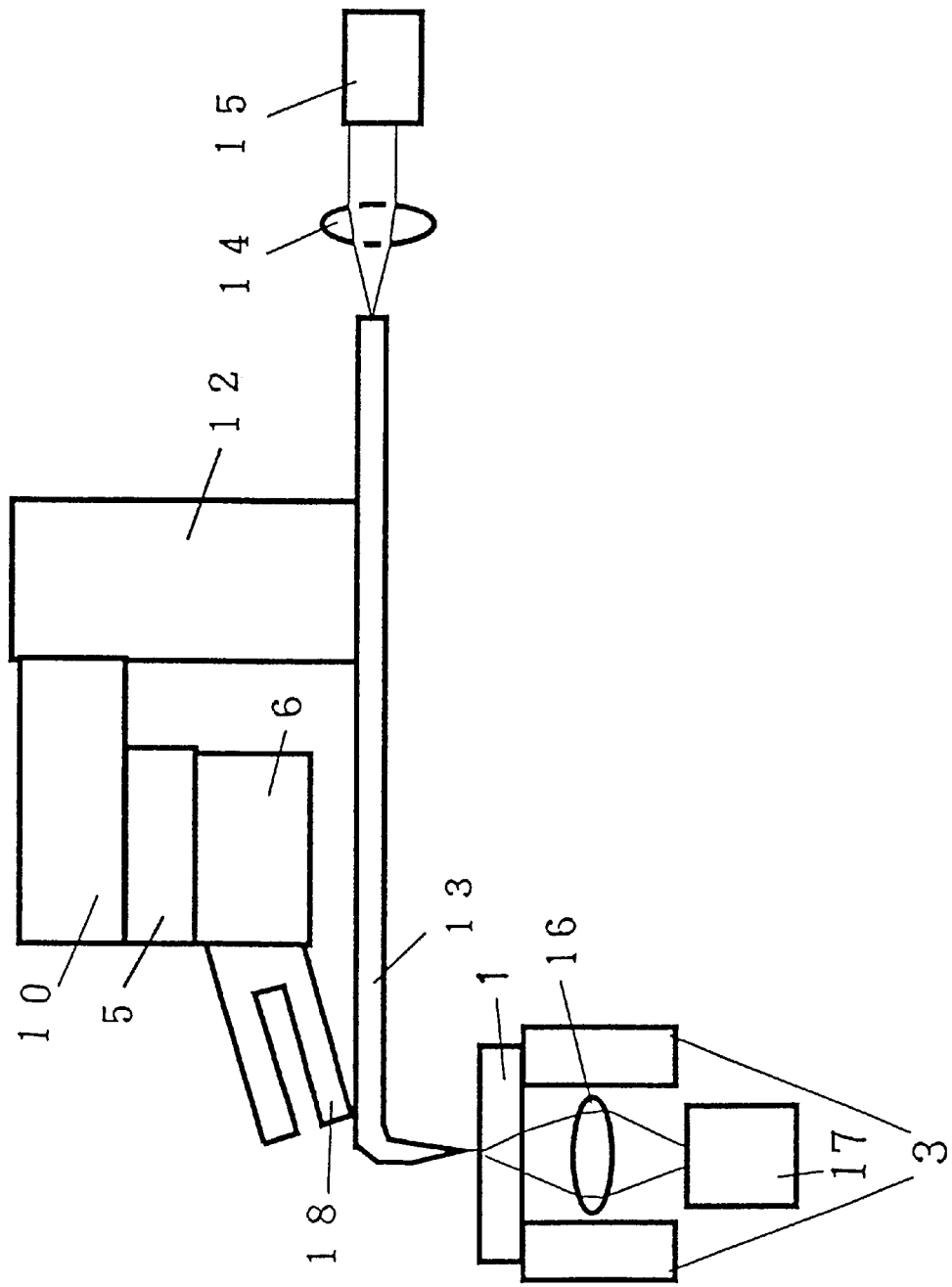
FIG. 8 is an explanatory view of a scanning probe microscope according to the present invention.

FIG. 8 is a view showing an example of a constitution in the case where a probe comprising an optical fiber is used as a probe having a wave guide. In the drawing, an optical fiber probe 13 is provided with a metallic coating at a portion thereof operating as a cantilever and at except a front end portion disposed closely to the surface of the measurement object 1, and a very small opening is formed at the front end portion. Light from a light source 15 can be introduced via a lens 14 to an end face of the optical fiber on a side opposed to the probe of the optical fiber. Meanwhile, light scattered by the surface of the sample 1 can be detected by an optical detector 17 via a lens 16 arranged to focus on the front end of the probe. A constitution where the arrangement of the optical detector 17 and the light source 15 is reverted and light is picked up from the front end of the probe is also possible. An example where a tuning fork type quartz oscillator 18 is used as the sensor cantilever will be shown.

Further, physical property information of the surface of the sample can be obtained by measuring the oscillation characteristics of the cantilever probe 2 and the sensor cantilever 4 mentioned above separately from each other. A probe having piezoelectric detecting means in the cantilever probe 2 may also be used. According to this system, as shown by FIG. 9A, signals are detected by arranging piezoelectric elements 19 of a bimorph type in parallel on the cantilever probe and reverting polarities thereof such that the signals are outputted in respect of twist of the cantilever probe 2. Observation of friction information of the surface can be carried out by subjecting the output signals to signal processing via the amplifier 8. According to the constitution, directions of bending the two piezoelectric elements are reverted by the twist of the cantilever probe 2 and accordingly, electric charge is generated in respect of the twist.

Otherwise, as shown by FIG. 9B, the detection of the twist can be carried out also by arranging a piezoelectric resistor 20 vertically to the longitudinal direction of the cantilever 2.

Figure 10:
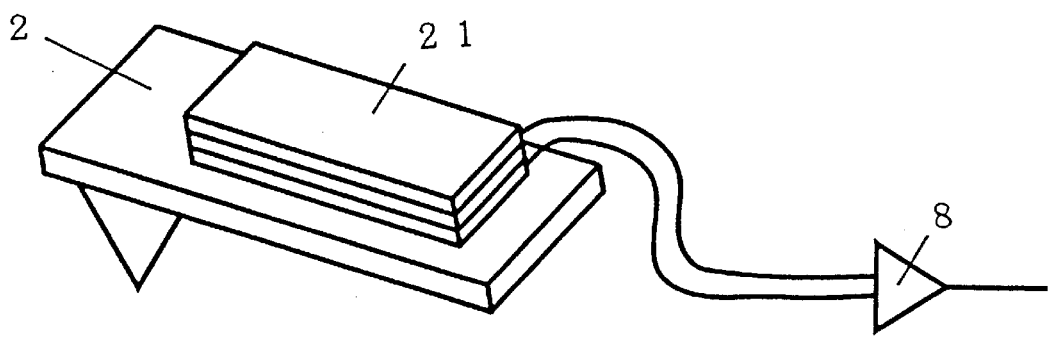
FIG. 10 is an explanatory view of a probe used in a scanning probe microscope according to the present invention.

When a piezoelectric element 21 is arranged simply on the cantilever probe 2 as shown by FIG. 10, physical property information such as viscoelasticity or the like can be detected by outputting displacement signals of the probe such as phase, amplitude and the like independent from the signal of the sensor cantilever 4.

According to the embodiments mentioned above, a description has been given of a system where a major spring element portion included in the cantilever probe 2 is arranged substantially horizontally to the surface of the measurement object 1 and a deflection between both in the distance direction is detected by which the force exerted in the distance direction is sensed and the distance control between the sample-probe is carried out.

Figure 11:
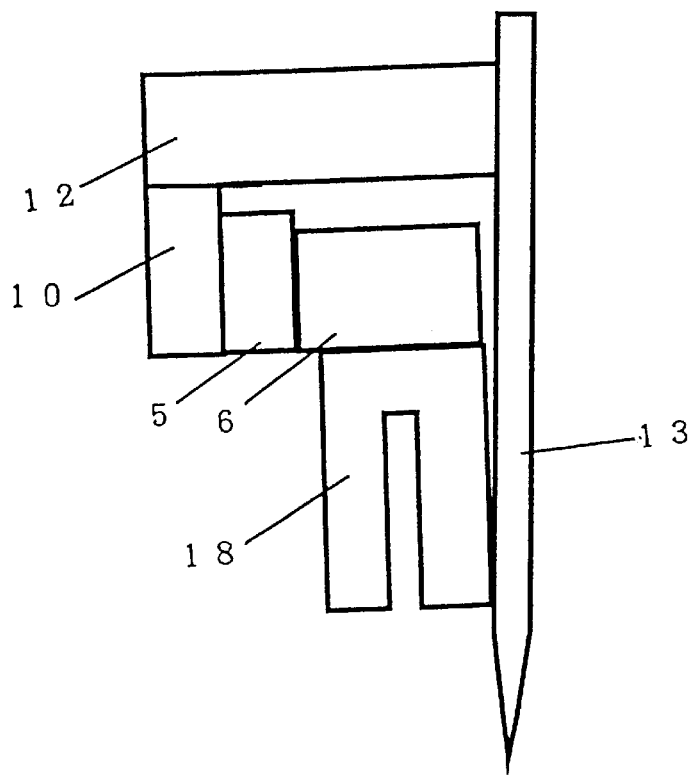
FIG. 11 is an explanatory view of a scanning probe microscope according to the present invention.

FIG. 11 shows a constitution where a major spring element portion included in the cantilever probe is arranged substantially vertically to the surface of the measurement object. There can be provided a constitution where shear force exerted between the front end of the cantilever probe 1 and the surface of the measurement object 1 (illustration is omitted), is sensed by which the distance control between the sample-probe is carried out. FIG. 11 illustrates an example where the optical fiber probe 13 of a straight type is used as a cantilever probe and the tuning fork type quartz oscillator 18 is used as the sensor cantilever.

Figure 12:
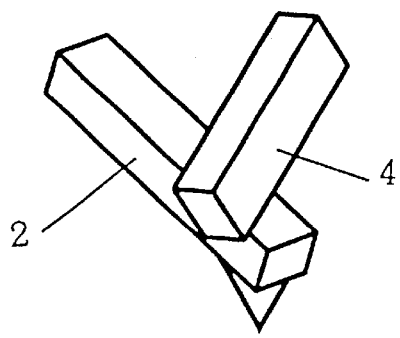
FIG. 12 is an explanatory view of a scanning probe microscope according to the present invention.

FIG. 12 illustrates an example constituted by bringing the cantilever probe 2 and the sensor cantilever 4 into contact with each other while intersecting each other. By bringing the cantilever probe 2 and the sensor cantilever 4 into contact with each other while intersecting each other, the contact position can be made difficult to shift.

What is claimed is:

1. A scanning probe microscope comprising: a cantilever probe disposable proximate a surface of a sample and having a first resonance frequency; a three-dimensional fine movement element for two-dimensionally scanning the cantilever probe and the surface of the sample relative to one another; and a sensor cantilever for detecting displacement of the cantilever probe during relative scanning movement between the cantilever probe and the surface of the sample, the sensor cantilever being spaced apart but within touching distance from the cantilever probe so that displacement of the cantilever probe is transmitted to the sensor cantilever by contact between the sensor cantilever and the cantilever probe, the sensor cantilever having a second resonance frequency different from the first resonance frequency.

2. A scanning probe microscope according to claim 1; further comprising oscillating means for oscillating at least one of the cantilever probe and the sensor cantilever; and means for controlling a distance between the cantilever probe and the surface of the sample in accordance with a change in resonance characteristic of the sensor cantilever.

3. A scanning probe microscope according to claim 1; wherein the sensor cantilever comprises a piezoelectric element which produces an output signal corresponding to displacement of the cantilever probe.

4. A scanning probe microscope according to claim 3; wherein the piezoelectric element comprises a quartz oscillator.

5. A scanning probe microscope according to claim 1; further comprising a position adjusting mechanism for adjusting a contact pressure between the sensor cantilever and the cantilever probe.

6. A scanning probe microscope according to claim 1; wherein a portion of the cantilever probe comprises an optical wave guide having an end surface coinciding with a front end of the cantilever probe.

7. A scanning probe microscope according to claim 6; wherein the cantilever probe comprises an optical fiber.

8. A scanning probe microscope according to claim 1; further comprising piezoelectric detecting means for outputting a signal corresponding to displacement of the cantilever probe independent from a signal corresponding to displacement of the cantilever probe outputted by the sensor cantilever.

9. A scanning probe microscope according to claim 8; wherein the piezoelectric detecting means outputs the signal in accordance with a phase and an amplitude of the cantilever probe.

10. A scanning probe microscope according to claim 8; wherein the piezoelectric detecting means comprises a plurality of piezoelectric detecting elements having reversed polarities disposed in parallel on the cantilever probe.

11. A scanning probe microscope according to claim 1; wherein the cantilever probe comprises a spring element portion disposed generally parallel to the surface of the sample during relative scanning movement between the cantilever probe and the surface of the sample; and further comprising means for detecting bending deformation of the cantilever probe during relative scanning movement between the cantilever probe and the surface of the sample; and means for controlling the distance between the cantilever probe and the surface of the sample in accordance with the detected bending deformation of the cantilever probe.

12. A scanning probe microscope according to claim 1; wherein the cantilever probe comprises a spring element portion disposed generally perpendicular to the surface of the sample during relative scanning movement between the cantilever probe and the surface of the sample; and further comprising means for detecting a shear force generated between the cantilever probe and the surface of the sample during relative scanning movement between the cantilever probe and the surface of the sample; and means for controlling the distance between the cantilever probe and the surface of the sample in accordance with the detected shear force.

13. A scanning probe microscope according to claim 1; wherein each of the sensor cantilever and the cantilever probe has a longitudinal axis; and wherein the sensor cantilever is disposed relative to the cantilever probe so that the longitudinal axis of the sensor cantilever crosses the longitudinal axis of the cantilever probe at least when the sensor cantilever and the cantilever probe do not contact one another.

14. A scanning probe according to claim 1; wherein the second resonance frequency is lower than the first resonance frequency.

15. A scanning probe microscope according to claim 14; further comprising first detecting means for detecting a phase and an amplitude of the cantilever probe, and second detecting means independent from the first detecting means for detecting a phase and amplitude of the sensor cantilever.

16. A scanning probe microscope according to claim 14; further comprising means for detecting a twisting movement of the cantilever probe.

17. A scanning probe microscope according to claim 1; wherein the second resonance frequency is higher than the first resonance frequency.

18. A scanning probe microscope according to claim 17; wherein the sensor cantilever has a contact portion for contacting a contact portion of the cantilever probe during scanning movement of the cantilever probe over the surface of the sample; and further comprising a hydrophobic film disposed on at least one of the contact portion of the sensor cantilever and the contact portion of the cantilever probe.

19. A scanning probe microscope comprising: a cantilever probe having a probe tip disposable proximate a surface of a sample; scanning means for scanning the probe tip and the surface of the sample relative to one another; a detecting member for detecting a displacement of the probe tip during scanning of the probe tip and the surface of the sample relative to one another; a support member for supporting the cantilever probe and for supporting the detecting member in spaced-apart relation to but within touching distance from the cantilever probe so that a displacement of the probe tip is transmitted to the detecting member by contact between the cantilever probe and the detecting member; and oscillating means for oscillating the cantilever probe at a first resonance frequency and for oscillating the detecting member at a second resonance frequency different from the first resonance frequency.

20. A scanning probe microscope according to claim 19; wherein the first resonance frequency is higher than the second resonance frequency.

21. A scanning probe microscope according to claim 19; wherein the second resonance frequency is higher than the first resonance frequency.

22. A scanning probe microscope according to claim 19; further comprising means for controlling a distance between the probe tip and the surface of the sample in accordance with a change in resonance characteristic of the detecting member.

23. A scanning probe microscope according to claim 19; further comprising a position adjusting mechanism for adjusting a contact pressure between the detecting member and the cantilever probe.

24. A scanning probe microscope comprising: a cantilever probe disposable proximate a surface of a sample; scanning means for scanning the cantilever probe and the surface of the sample relative to one another; detecting means for detecting a displacement of the cantilever probe during scanning of the cantilever probe and the surface of the sample relative to one another; support means for supporting the detecting means in spaced-apart relation to but within touching distance from the cantilever probe so that a displacement of the cantilever probe is transmitted to the detecting means by contact between the cantilever probe and the detecting means; and oscillating means for oscillating the cantilever probe at a first resonance frequency and for oscillating the detecting means at a second resonance frequency different from the first resonance frequency.

25. A scanning probe microscope according to claim 24; wherein the first resonance frequency is higher than the second resonance frequency.

26. A scanning probe microscope according to claim 24; wherein the second resonance frequency is higher than the first resonance frequency.

27. A scanning probe microscope according to claim 24; further comprising means for controlling a distance between the cantilever probe and the surface of the sample in accordance with a change in resonance characteristic of the detecting means.

28. A scanning probe microscope according to claim 24; further comprising a position adjusting mechanism for adjusting a contact pressure between the detecting means and the cantilever probe.

* * * * *